(12) United States Patent
Wilt et al.

(10) Patent No.: US 8,681,587 B2
(45) Date of Patent: Mar. 25, 2014

(54) METHOD AND APPARATUS FOR AN ACOUSTIC-ELECTRIC CHANNEL MOUNTING

(75) Inventors: Kyle R. Wilt, Sand Lake, NY (US); Henry A. Scarton, Troy, NY (US); Tristan Lawry, Niantic, CT (US); Gary J. Saulnier, East Greenbush, NY (US); Jonathan D. Ashdown, Greenwich, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 13/559,164

(22) Filed: Jul. 26, 2012

(65) Prior Publication Data

US 2013/0258815 A1   Oct. 3, 2013

Related U.S. Application Data

(60) Provisional application No. 61/686,022, filed on Mar. 29, 2012.

(51) Int. Cl.
*G10K 11/00* (2006.01)
*G01S 7/521* (2006.01)

(52) U.S. Cl.
CPC .................................... *G01S 7/521* (2013.01)
USPC ........................... 367/173; 367/188; 367/189

(58) Field of Classification Search
USPC ................................................ 367/173, 188
See application file for complete search history.

(56) References Cited

U.S. PATENT DOCUMENTS

| | | | |
|---|---|---|---|
| 3,714,619 A | 1/1973 | Morgan et al. | |
| 4,811,310 A | 3/1989 | Wille | |
| 4,932,006 A | 6/1990 | Delignieres | |
| 5,235,557 A | 8/1993 | Masreliez | |
| 5,697,319 A | 12/1997 | Steensland et al. | |
| 5,729,508 A * | 3/1998 | Baker et al. | 367/176 |
| 5,838,635 A | 11/1998 | Masreliez | |
| 5,949,742 A * | 9/1999 | Delany et al. | 367/188 |
| 5,982,297 A | 11/1999 | Welle | |
| 6,037,704 A | 3/2000 | Welle | |
| 6,052,335 A | 4/2000 | Korolenko | |
| 6,127,942 A | 10/2000 | Welle | |
| 6,201,767 B1 | 3/2001 | Lagace | |
| 6,343,049 B1 | 1/2002 | Toda | |

(Continued)

FOREIGN PATENT DOCUMENTS

| | | |
|---|---|---|
| WO | WO 2008/075092 | 6/2008 |
| WO | WO 2011/027168 | 3/2011 |
| WO | WO 2011/027169 | 3/2011 |

*Primary Examiner* — Isam Alsomiri
*Assistant Examiner* — James Hulka
(74) *Attorney, Agent, or Firm* — Notaro, Michalos & Zaccaria P.C.

(57) ABSTRACT

Method and apparatus for rotational alignment and attachment of ultrasonic transducers to a barrier with one submerged surface uses a temporary transducer assembly to position mounting rings on opposite surfaces of the barrier. Plural permanent transducers are then mounted to each mounting ring and are aligned with each other across the barrier by virtue of the alignment of their mounting rings. The submerged mounting ring is used like a cylinder in combination with a mounting plate for the transducers on the submerged side of the barrier or each submerged side transducer has a suction cup fitting for use to exclude water from between each transducer and the submerged barrier surface to facilitate bonding of the submerged side transducers to the barrier.

15 Claims, 6 Drawing Sheets

(56) References Cited

U.S. PATENT DOCUMENTS

| | | |
|---|---|---|
| 6,856,580 B2 | 2/2005 | Eyries |
| 7,236,427 B1 | 6/2007 | Schroeder |
| 7,433,268 B1 | 10/2008 | Schroeder |
| 2004/0052160 A1* | 3/2004 | Eyries .......................... 367/157 |
| 2005/0201205 A1 | 9/2005 | Chavez et al. |
| 2009/0314193 A1 | 12/2009 | Groves et al. |
| 2010/0027379 A1 | 2/2010 | Saulnier et al. |

* cited by examiner

METHOD AND APPARATUS FOR AN ACOUSTIC-ELECTRIC CHANNEL MOUNTING

CROSS-REFERENCE TO RELATED APPLICATION

This application claims priority on U.S. provisional patent application 61/686,022 filed Mar. 29, 2012, which is incorporated herein by reference.

FIELD AND BACKGROUND OF THE INVENTION

The present invention relates generally to the field of transducers, and in particular to rotationally aligning transducers on opposite sides of a barrier, and to attaching transducers to submerged surfaces.

A transducer is a device that converts one form of energy to another. Transducers may be used, among other functions, to transmit and receive data or power across a solid barrier without requiring any holes in the barrier. Conceptually, this can be done by a first transducer on one side of a barrier turning electrical energy into mechanical energy, the mechanical energy traveling across the barrier, and being received by a second transducer on the other side of the wall which converts some portion of the mechanical energy back into electrical energy. This ability is particularly useful for transmitting energy and data through barriers like ship and submarine hulls, pressure vessel tanks and other walls separating extreme environments where it is often undesirable to create openings for wires.

Figure 9:
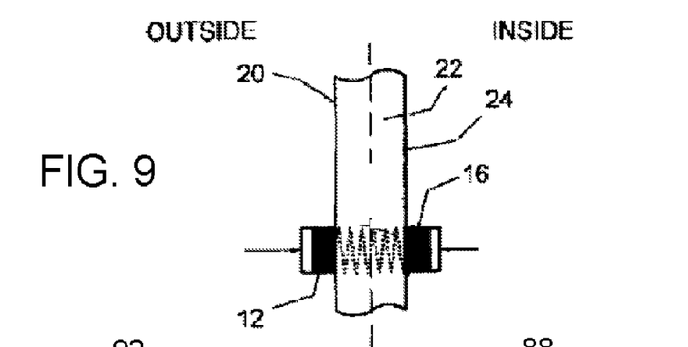
FIG. 9 is a schematic diagram of piezoelectric transducers aligned on opposite sides of a steel ship hull.

FIG. 9 is partially taken from published patent application US2010/0027379, and shows a pair of axially aligned piezoelectric ultrasonic transducers 12 and 16 that are acoustically coupled to opposite surfaces 20 and 24 of a steel wall 22 that may be the hull of a ship or submarine or other barrier.

Ideally, ultrasonic communication transducer devices should be attached directly to the communications barrier. It is generally desirable to have a smooth, uninterrupted, uniform barrier between coupled transducers.

The attachment of transducers to solid barriers is often simple in dry laboratory or factory environments. Although it may be relatively simple to affix transducers to the surface of oceangoing vessels when such vessels are in dry dock, it will sometimes be preferable to install transducers below the water line without the expense, delay, and difficulty of moving a large ship out of the water.

Proper transducer attachment is extremely difficult in an underwater environment such as a submerged portion of a ship's external hull, however, for a variety of reasons. First, it is usually desirable to remove all water, as well as any other extraneous substances, from the attachment surface. It is also difficult to apply and retain epoxy or other adhesives in an underwater environment, and to provide the conditions necessary for such adhesives to harden or cure properly. It is often necessary to provide a sustained loading force at the attachment site while an epoxy or adhesive sets, which poses additional challenges when the surface is submerged. Thus, there is a need for apparatus and methods for removing and excluding water from a submerged transducer attachment surface, for applying adhesives to submerged attachment surfaces, and for applying sustained pressure to such surfaces to allow adhesives to set. It is particularly desirable to have apparatus and methods for both direct attachment of transducers to underwater substrates, and for attachment utilizing an intermediary layer.

Furthermore, it can be difficult to align transducers on opposite sides of a surface, such as the hull of a large ship or a submarine, when only one side of the surface can be seen at a time. Techniques have been developed to positionally align transducers across a ship's hull using signal peaking at a single point. See WO2011/027168 and WO2011/027169, both to Bagshaw et al. Single point peaking techniques are not well suited, however, for aligning a plurality of transducers in a single compact arrangement through a hull because such arrangements must be aligned axially as well as positionally, and rotational alignment cannot be determined using a single peaking point. Thus, it is desirable to have a convenient method for determining rotational alignment across a hull using a plurality of peaking points corresponding to a plurality of spaced transducers.

Transducers may be mounted to communications surfaces such as hulls either directly, typically one at a time, or using an intermediary layer which may carry multiple previously-configured transducers.

Direct attachment is the preferred coupling method. Direct attachment minimizes the number of interfaces between transducers on opposite sides of the barrier, which results in greater transfer efficiency and less interference. Hull curvature can cause variations in the thickness of the adhesive layer between flat transducers and plates, and rounded communication surfaces they are attached to. Any curvature of the communication surface is less significant using direct attachment because each transducer will have a smaller area than a larger intermediary plate.

It can be difficult to align multiple directly attached traducers across a barrier because direct attachment is often done one transducer at a time. Thus, methods for aligning multiple transducers being mounted directly to a submerged hull are needed. Direct attachment can also be difficult because individual transducers, such as piezoelectric crystals, are often fragile. As a result, handling individual transducers, and holding them against the communication surface during adhesion, risks breaking the transducers.

Attachment using an intermediary layer, such as transducers on top of a metal plate, is easier because multiple transducers can be attached to the single plate in precise alignments in a factory setting. It can be easier to align two intermediary plates across a hull, each plate carrying several transducers, than to align a large number of individual transducers, two at a time in the field. An intermediary plate can also carry all the electronics that are needed to be attached to the transducers it carries. This avoids the difficulty of trying to attach electronics to transducers, underwater, after they have been mounted to a ship. It can also be easier to handle fragile transducers that are pre-mounted on a durable metal plate because any pressure required during the adhesion process can be placed on the intermediary plate instead of on the fragile transducers themselves.

The main disadvantage of using an intermediary plate is that signals traveling between transducers must cross a greater number of interfaces, increasing signal reflections and interference. Thus, transducers mounted on intermediary layers may be less efficient. It is also difficult to achieve minimal and uniform adhesive thickness between a flat intermediary plate and a curved communication surface because an intermediary plate will have a greater surface area than individual transducers. This excess adhesive may also reduce transducer efficiency.

SUMMARY OF THE INVENTION

The present invention overcomes several serious difficulties posed while trying to align and attach transducers on opposite sides of a barrier like a submarine hull or the like, when the vessel is in a body of water, or other barriers where one or both sides of the barrier may be in a hostile, e.g. under high pressure, high temperature or nuclear conditions, or a liquid environment.

The invention solves these obstacles is significant part by using mounting members, which preferably take the form of rings having threaded bolt holes at their periphery. Methods and apparatus are presented for rotationally aligning mounting rings on opposite sides of a hull using a temporary, removable plate having multiple temporary transducers. Peaking methods are used to locate the plurality of transducers with respect to the opposite side of a wall, such as a ship's hull. The mounting rings can be aligned across the wall using the known relative locations of the plurality of transducers.

Rotational alignment of mounting rings across the hull makes it relatively simple to align permanent transducers within each ring with corresponding transducers within the mounting ring on the opposite side of the wall. Without rotational alignment, is it difficult or impossible to align multiple transducers within a small area of the hull wall.

Preferably, ring alignment is achieved by employing a temporary alignment plate having a plurality of spaced, temporary transducers.

Preferably, the alignment plate is easily added and removed to mountings rings by screws or bolts, and may be reused.

The mounting rings are round, resembling a thin section of a hollow cylinder, and have approximately six threaded bolt holes spaced evenly about their perimeter, although more or less holes can be used.

This invention also provides methods and assemblies for attaching transducers directly to submerged surfaces, and also for attaching an intermediary plate holding multiple transducers to a submerged surface. Both the direct attachment methods and the intermediary plate methods utilize previously aligned mounting rings having threaded bolt holes at their periphery.

The mounting methods provide means for removing water from the submerged surfaces, preferably within a section of the hull defined by a mounting ring.

The mounting methods provide means for using epoxy or other adhesives to attach transducers and transducer assemblies to submerged surfaces, preferably to a section of the hull within the circumference of a mounting ring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
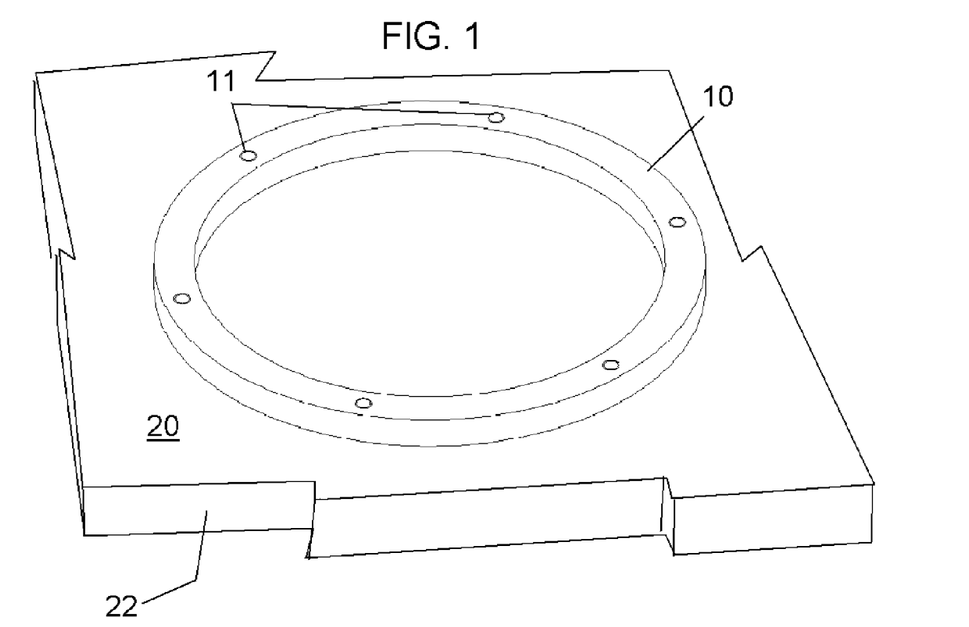
FIG. 1 is a top perspective view of a mounting ring of the invention.

Referring now to the drawings, in which like reference numerals are used to refer to the same or similar elements, FIG. 1 shows a mounting ring or member 10 of the invention having threaded bolt holes 11 arranged about its periphery. In an embodiment of the invention the ring 10 has six threaded bolt holes 11 spaced evenly around its circumference although more or fewer bolt holes can be used. Shapes other than round rings and other arrangements of threaded bolt holes are possible. Typically the side of the ring 10 lacking holes will be affixed, such as by welding or maritime adhesive, to a ship's hull or the surface of another barrier.

A diagram of a steel ship's hull 22 having two surfaces 20 and 24, and transducers 12 and 16 aligned on opposite sides of the hull 22, is at FIG. 9.

Figures 2A, 2B:
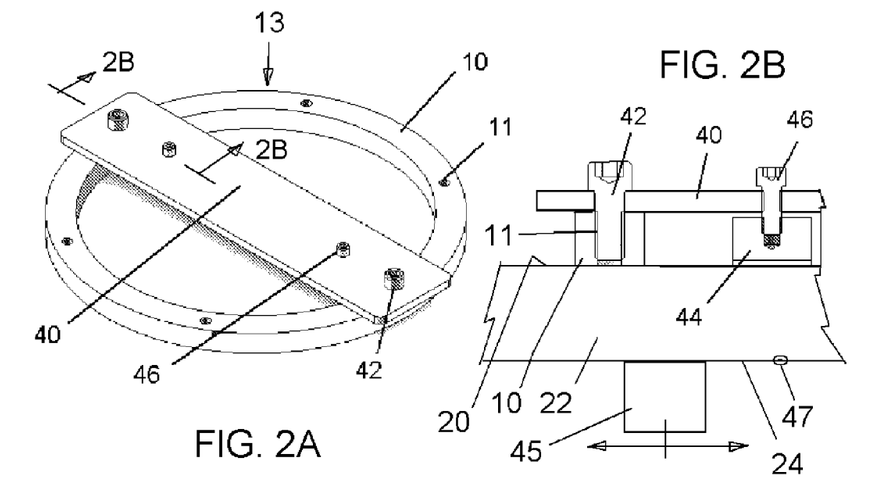
FIG. 2A is a top perspective view of a mounting ring with an attached alignment plate.
FIG. 2B is a partial sectional view taken along line 2B-2B of FIG. 2A of the mounting ring with an affixed mounting plate and peaking transducers.

FIGS. 2A and 2B show two views of an alignment assembly 13 for determining the translational and rotational position of a mounting ring 10 through the thickness of a wall or barrier 22. The alignment process preferably begins with a mounting ring or member 10 fixed to one side 20 of the wall 22 that the transducers are to communicate through.

The wall may be of any material that will allow transducers to convey energy and/or information between one another, but will often comprise metal, e.g. steel, and may be part of a sea craft. If one side of the wall is submerged—being the outside of a submarine, for example—it is preferable that the first mounting ring be fixed to the submerged side. This will make it easier to perform the peaking process, which must be done from the side of the wall opposite the alignment assembly and the first mounting ring, understanding there will be no line-of-sight to the outside of the wall to help with aligning the opposite mounting ring.

A temporary alignment plate 40 is removably fixed to the periphery of the outside mounting ring 10. This attachment may be accomplished by bolts 42 or screws threaded into each of two bolt holes 11 in the mounting ring 10, although any reversible attachment method may be used.

The temporary alignment plate 40 includes a plurality of ultrasonic transducers 44 spaced along the length of the plate 40. In a preferred embodiment the plate includes two transducers, although more may also be used. The transducers 44 are preferably connected to the plate 40 by bolts 46.

The assembly 13 is adapted so that the positions of each the plurality of transducers 44 may determined from the opposite, inside surface 24 of the wall 22 using a peaking technique to locate each of the several transducers. This is done by moving a signal receiving transducer 45 along the inside surface 24 of the wall in the general location of the outside mounting ring 10 that can be estimated without actually seeing the outside ring until a maximum signal is detected at one of the outside transducers 44. This will be the location at which the inside and outside transducers 44 and 45 are aligned so that a mark 47 is placed on the inside surface 24 at this location. The process is then repeated to mark the location of the other transducer 44.

With both positions of the transducers 44 marked on the opposite inside of the wall 24, both the location and the rotational alignment of the outside mounting ring 10 can then be determined from the opposite side 24 of the wall by comparing the location of the plurality of transducers 44 and their known and marked relationship relative to the outside mounting ring 10, the bolt holes 11, and the alignment plate 40.

Using this information, it is then a simple matter to attach a second mounting ring 10 to the opposite inside 24 of the wall 22 so that it has the same location and rotational alignment as the outside mounting ring 10 on surface 20. The alignment plate 40 may be removed from the first mounting ring 10 and reused.

It is particularly desirable that the bolt holes 11 of the mounting rings 10 on the opposite sides of the wall 22 are aligned because this alignment makes it easy to align transducers within the respective rings from opposite sides of the wall. Given aligned rings 10 and bolt holes 11, the methods and apparatus of the remainder of this invention, or other methods and apparatus, can be used to align and attach various transducers across the thickness of the wall 22.

In one preferred embodiment of the invention, the method, alignment assembly 13, and alignment plate 40 described above are first used to align mounting rings 10 and bolt holes 11 on opposite sides of a boat hull wall 22. Once both mounting rings 10 are aligned and affixed to their respective sides of the wall 22, the alignment plate 40, which has been attached to a ring 10 on the submerged outside part of a ship, is removed. At that point one of the methods described below is preferably used to attach transducers, directly or using an intermediary layer, to the submerged side of the boat hull wall 22.

Figure 5:
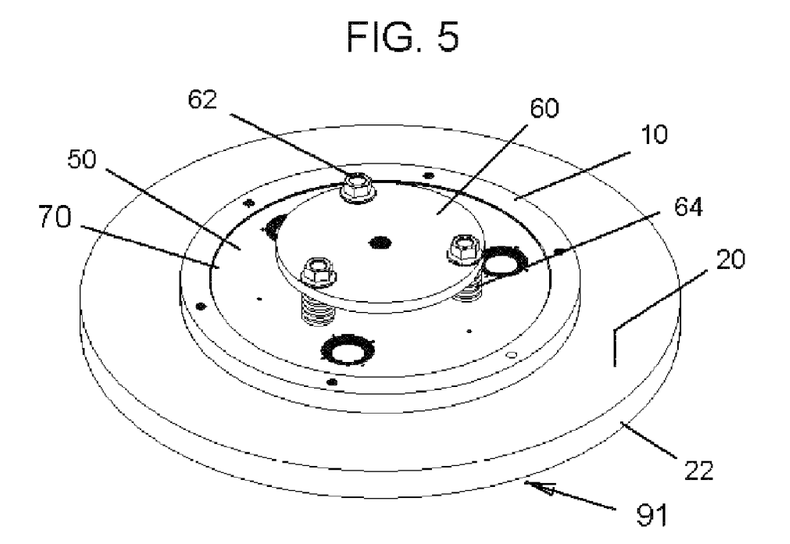
FIG. 5 depicts a top perspective view of an assembly for mounting a mounting plate on a submerged wall including a mounting plate, a mounting ring, a pressing plate, and the wall.

FIG. 5 shows a preferred mounting plate installation assembly 91 for mounting a plurality of transducers to a submerged surface 20 using an intermediary layer 50, as opposed to mounting individual transducers directly on a submerged surface. This preferred assembly 91 comprises a mounting ring 10 fixed to a submerged metal surface 20, the mounting ring 10 comprising a plurality of bolt holes 11 spaced around its periphery.

Figure 4A:
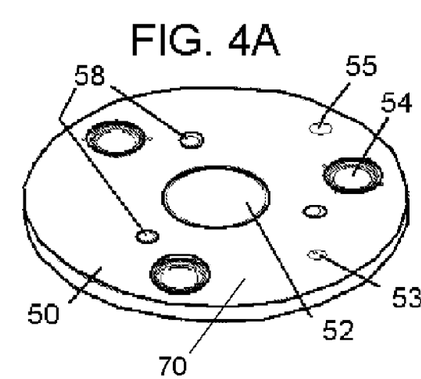
FIG. 4A depicts the top side (left) and FIG. 4B the bottom side (right) of an intermediary plate for mounting four transducers to a submerged surface.
Figure 4B:
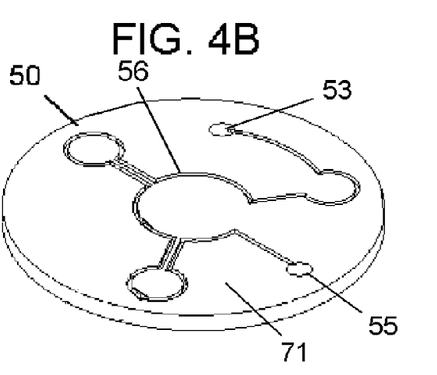

The instant preferred embodiment employs a mounting plate 50 as an intermediary layer, although other intermediary layers are possible within the scope of this invention. FIGS. 4A and 4B show the top side 70 and the bottom side 71 of the mounting plate 50. The bottom side 71 faces towards the communication surface 20, and the top side 70 faces away from the surface 20.

One or more transducers 52, 54 are preferably affixed to the top side 70 of the mounting plate 50. Preferably the transducers 52, 54 are each located within a separate depression in the top side 70 of the plate 50. In one particularly preferred embodiment, shown at FIG. 4A, a single plate includes one large transducer 52 to send or receive power, and three smaller transducers 54 for data communication. Persons of skill in the art will recognize that a variety of transducers and transducer arrangements can be adapted for use with the mounting plate 50 of the instant invention.

The mounting plate 50 preferably comprises the same metal as the metal surface 20, such as the outside of a boat hull 22, that it will be mounted to.

The mounting plate 50 preferably includes a plurality of threaded bolt holes 58 on the top side 70 of the plate 50. The plate 50 also preferably has both an inlet hole 53 and an outlet hole 55 extending through the thickness of the mounting plate 50. Other arrangements of inlet and/or outlet holes are also compatible with this invention, however.

The plate 50 also preferably has a channel 56 formed or carved into its bottom side 71. The channel 56 preferably communicates with both an inlet hole 53 and an outlet hole 55. Preferably the channel 56 is continuous and is adapted to direct adhesive injected into the inlet hole 53 to all portions of the bottom side 71 of the mounting plate 50, particularly areas near where each of the transducers 52, 54 are fixed to the mounting plate 50 above. Alternatively, or in addition, the channels 56 can function to accept excess adhesive squeezed from between the flat portions of the bottom side 71 of the plate 50 and the surface 20, helping to achieve a thin, even connections in those areas.

The mounting plate 50 is sized and shaped to fit within the mounting ring 10. Preferably the mounting plate has a sealant 72 at its periphery, such as an O-ring, that allows the mounting plate 50 to slide toward and away from the hull surface 20 while maintaining a water-tight seal between the mounting plate 50 and the mounting ring 10 in a manner analogous to a piston in a cylinder.

The mounting plate installation assembly 91 may also include a means for selectably moving the mounting plate 50 towards and away from the hull surface 20. In a preferred embodiment, a pressing plate 60 (FIGS. 5, 11A and 11B) is removably engaged to the top side 70 of the mounting plate 50 using a plurality of bolts 62, a plurality of springs 64, and threaded bolt holes 58 on the top side 70 of the mounting plate 50. The pressing plate can preferably be removed from the assembly 91 and the mounting plate 50 once the plate 50 has been attached to the hull surface 20.

FIGS. 3A to 3D illustrate several steps (hereafter referred to as steps (1)-(4)) that can be used in attaching mounting plates 50 to submerged surfaces 20 within a mounting ring 10. These steps generally comprise using the plate installation assembly 91 as a piston to pump substances into and out of a cavity 73 or gap defined by the hull surface 20, the mounting plate 50, and the mounting ring 10.

Figure 3A:
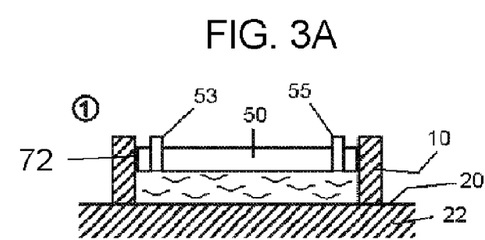
FIGS. 3A to 3D are four depictions of the same sectional view of a mounting ring affixed to a wall, each depicting an engaged mounting plate in a different position, and illustrating a different step for removing water from a cavity between the mounting plates and the wall using the mounting plate as a piston.

In a first preferred method, mounting plate 50 is held at a fixed distance from the hull 22 as shown in FIG. 3A step (1), while the gap is flushed via inlet hole 53 and outlet hole 55 with an easily evaporable liquid (e.g. alcohol or acetone). This flushing will clean both the hull surface 20 and the bottom surface 71 of the plate 50, while also removing water from the gap. Once this flushing is completed, the gap will preferably be filled completely with the evaporable liquid.

Figure 3B:
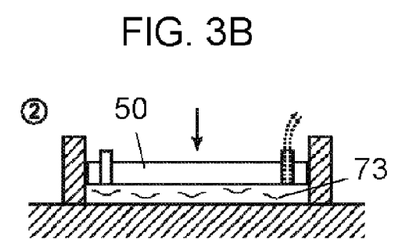
Figures 3C, 3D:
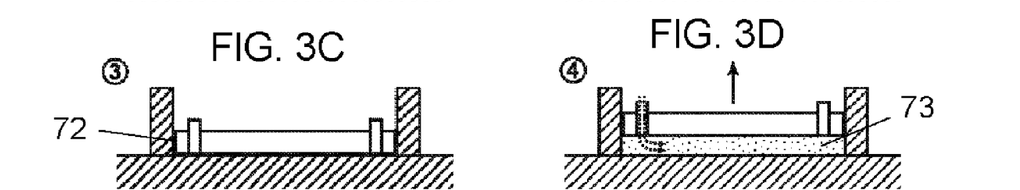

To remove the evaporable liquid, compressed air or other gas is forced into the gap via the inlet hole 53, pushing as much of the flushing fluid out of the cavity 73 via the outlet hole 55 as possible as depicted in FIG. 3D step (4). Upon the extraction of as much fluid as possible, a vacuum is immediately applied to the cavity 73, preferably via the outlet hole 55. It may be necessary to block one or more holes 53, 55 to keep water out of the cavity 73 during the vacuuming process.

This vacuuming is adapted to accomplish two things. First, it expedites the evaporation of any remaining liquid. Second, it reduces the amount of gas within the cavity 73, which reduces the chance of bubbles later being caught within the epoxy or other adhesive.

While the vacuum is still being applied to the cavity 73, epoxy (or another adhesive) is injected into the inlet hole 53 until it permeates the cavity 73 and begins to flow out the outlet hole 55 or port from which the vacuum is preferably being applied. The vacuum is then removed and the epoxy flow is stopped. Ideally the cavity 73 contains only epoxy, and no other liquids or gasses, at this step of the process.

The plate 50 is then pressed towards and against the hull surface 20 as illustrated in FIGS. 3B and 3C steps (2) and (3), thus forcing excess epoxy to flow out from holes in the mounting plate 50, in this embodiment holes 53 and 55. The force is preferably applied via a pressing plate 60. This force is applied and maintained until the epoxy has cured to ensure that the final bonding layer between the mounting plate 50 and the hull surface 20 is as thin and bubble-free as possible.

A second method for using the plate installation assembly 91 for evacuating the gap or cavity 73 for installing a mounting plate 50 is even better illustrated by FIG. 3, and does not require use of a vacuum. This second method starts with the mounting plate 50 being inserted into the mounting ring 10, resulting in a cavity show in FIG. 3A step (1) between the hull surface 20 and plate 50. At this point, the cavity 73 contains seawater.

During the next step (FIG. 3B step (2)) the mounting plate 50 is pushed against hull surface 20, forcing the water within the cavity 73 to flow out from the outlet hole 55 or from both holes 53 and 55. The force is again preferably applied via a pressing plate 60. Once the mounting plate 50 is pushed all the way against the hull as shown in FIG. 3C step (3), a small amount of water may remain in the interface. It is preferable to remove even this remnant water to ensure proper coupling.

To accomplish this, an evaporable fluid, such as alcohol or acetone, is injected via an inlet port 53 to the cavity 73 while the mounting plate 50 is gently pulled away from the surface 20 as shown in FIG. 3D step (4). This brings the system back to step (1) but with the gap filled with evaporable flushing fluid instead of seawater. It may be necessary to temporarily cap one or more holes 53, 55 at this or other steps to prevent seawater from reentering the cavity 73.

The four steps shown at FIGS. 3A to 3D steps (1) to (4) are then repeated, except that pressurized air (or some other gas) is injected at step (4) the first repeat (to remove and evaporate the evaporable liquid), and epoxy is injected at step (4) for the final repeat. At this step the cavity 73 should only contain epoxy.

The mounting plate 50 is then pushed towards the hull surface 20 as shown at FIG. 3B step (2), and held down in the position shown at FIG. 3C step (3). Preferably this forces and holds out all gas bubbles from the cavity 73. The mounting plate 50 is preferably held down against the surface 20 until a strong, thin adhesive layer has finished hardening.

Figure 11A:
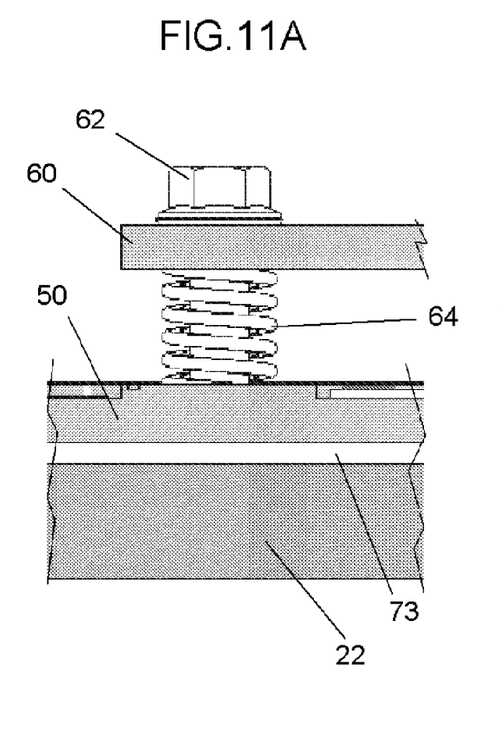
FIG. 11A shows a pressing plate connected to a mounting plate by screws and springs before (left) and at FIG. 11B, after (right) the pressing plate pushes the mounting plate into contact with the hull surface below.
Figure 11B:
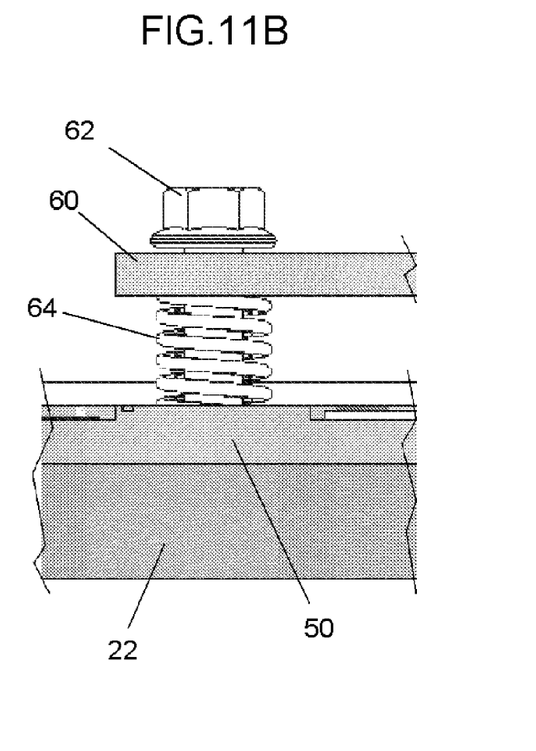

FIGS. 5, 11A and 11B show the use of a pressing plate 60 connected to mounting plate 50 by bolts 62 with springs 64 for biasing the plate 50 toward the hull surface 20 that can be used to perform the steps (1) to (4) of FIGS. 3A to 3D. An actuator (not shown) is preferably connected to the pressing plate 60 via a central hole through the pressing plate 60 for pulling and pushing the intermediate plate 50 as needed to perform either attachment method described above. This actuator will likely use the mount ring as a base to provide the pushing and pulling forces needed.

FIGS. 6A to 8 illustrate preferred embodiments of an assembly 90 for mounting a transducer 51 directly to a submerged surface 20, which may be the external surface of a metal boat or submarine hull. This method preferably involves one or more transducers 51 being mounted independently and directly to a submerged surface 20 within the circumference of a mounting ring 10, the mounting ring having a plurality of bolt holes 11 and having been previously aligned with a mounting ring 10 on the opposite side of the hull 22.

The preferred assembly includes a transducer 51 removably mounted to a backing 80, the backing 80 having a cup-shaped flange 82 at its periphery that also surrounds the transducer 51 at the periphery of the transducer. See FIGS. 6A and 6B. Preferably the backing 80 and the flange 82 are a unitary piece. Preferably the backing 80 and the flange 82 comprise an elastic substance, such as rubber, silicone, or a resilient plastic, that is flexible and that can be partially deformed without being permanently damaged. Preferably the elastic backing 80 and the flange 82 together form and resemble a round suction cup. Preferably the elastic backing 80 and flange 82 are adapted to avoid damaging the transducer 51, such as by spreading and managing direct pressure on the transducer, during the installation process.

Figure 6A:
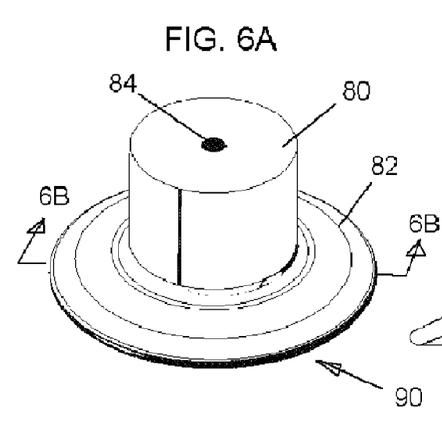
FIG. 6A depicts a top perspective view and FIG. 6B a sectional view taken along line 6B-6B of a backing and flange for mounting a transducer directly on a submerged hull and, in the sectional view only, a transducer under the backing.
Figure 6B:
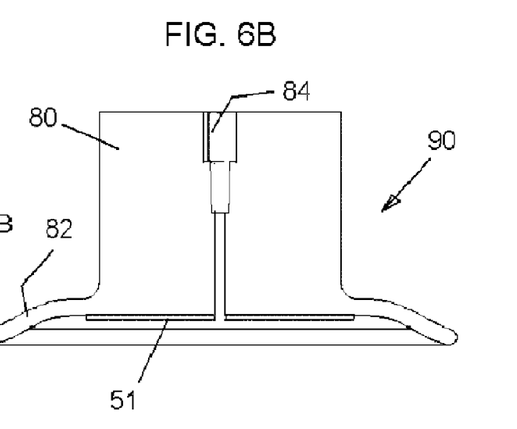

The backing 80 and the flange 82 are positioned on the submerged surface 20 so that the backing 80, the flange 82, and the surface 20 collectively form a cavity 83 with the transducer 51 held within the cavity 83. Preferably the backing 80, the flange 82, and the transducer 51 are positioned on a submerged metal surface within the diameter of a mounting ring 10 previously fixed to the submerged surface 10 by welding or marine adhesive.

Figure 7:
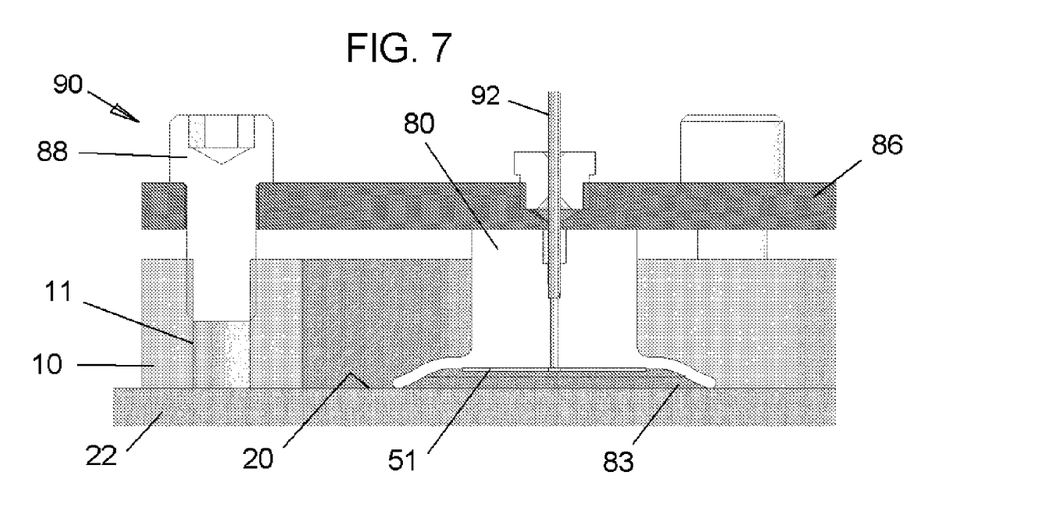
FIG. 7 depicts a radial cross-sectional view of an assembly for mounting a transducer directly on a submerged hull before the backing and transducer are fully pressed against the hull.
Figure 8:
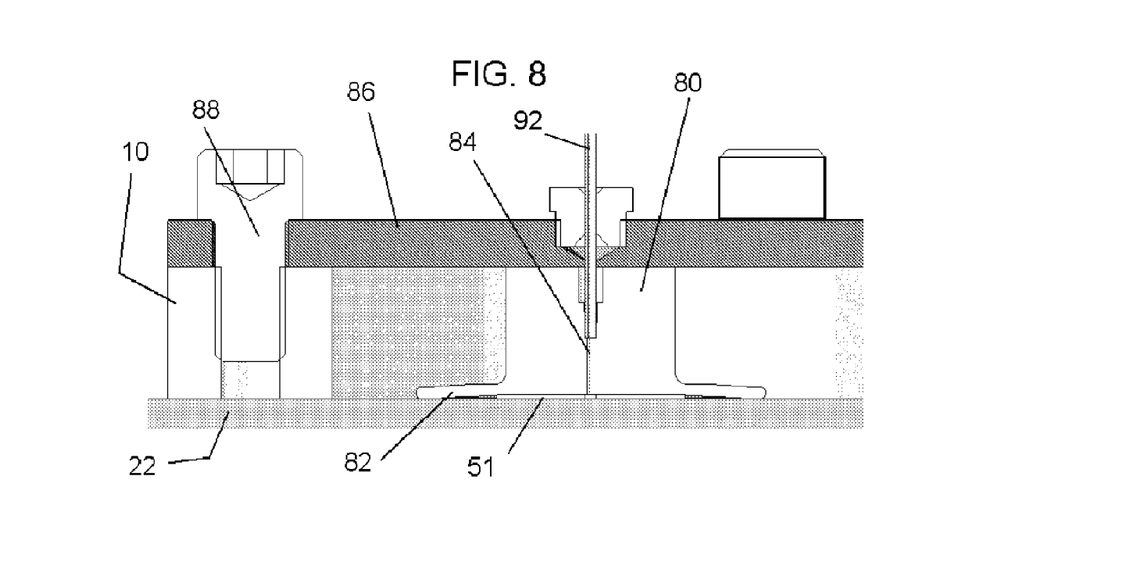
FIG. 8 depicts the same sectional view as FIG. 7, corresponding to line 8-8 of FIG. 10, after the backing plate has pushed the backing, flange, and transducer towards the hull.

The assembly 90 is adapted so that as the backing 80 is pressed towards the surface 20, the flange 82 deforms and creates a temporary water-tight seal with the surface 20. FIG. 7 shows an assembly 90 before the backing 80 has been fully pressed towards the surface 20, with a cavity 83 still clearly visible, and FIG. 8 shows an assembly after the pressing step. This pressing motion will shrink, and possibly even eliminate, the cavity 83. The assembly may be adapted so that before the backing 80 is pressed towards the surface 20, only the periphery of the flange 83 is in contact with the surface 20, while after the pressing both a larger portion of the flange 83 and the transducer 51 contact the surface 20.

A single continuous hole 84 extends through the backing 80 and the transducer 51. The hole 84 is adapted to pass pressurized liquids and gasses originating outside the assembly 90 via tubing 92 to the space in the cavity 83 between the transducer 51 and the submerged surface 20. In alternative embodiments, the continuous hole 84, or a second hole, may also be adapted to accommodate electrical contacts reaching the transducer. Preferably the hole 84 extends through the mutual center of a round backing 80 and a round transducer 51, though other shapes and arrangements are possible. A hollow tube 92 removably inserted through the hole 84 may optionally be used to inject pressurized air and/or epoxy.

The assembly 90 may include a backing plate 86 (FIGS. 7-8) removably connected to the mounting ring 10 by a plurality of bolts 88 or screws ("threaded couplings") engaged with bolt holes 11 in the mounting ring 10. In a most preferred embodiment the backing plate 86 (a.k.a. "alignment plate") has a size, diameter, and circular shape similar to the mounting ring 10 to substantially cover the mounting ring (see FIG. 10). The backing plate 86 is preferably adapted to press the elastic backings 80 and transducers 51 within the mounting ring 10 towards the submerged metal surface 20, and to hold the transducer(s) 51 in place while epoxy is injected and allowed to harden. The backing plate 86 may be adapted to press several elastic backing 86 and transducer 51 arrangements within a mounting ring 10 simultaneously. The backing plate 86 may include a plurality of holes through its thickness to accommodate tubes conveying air and adhesives, attachment means such as bolts, and/or electronic wires.

In a preferred embodiment the backing plate 86 is moved towards the surface 20 by progressively screwing bolts 88 into the bolt holes 11 in the mounting ring 11. As the bolts 88 are screwed into the bolt holes 11, the bolts and the backing plate 86 are moved closer to the surface 20. See FIGS. 7-8. Assemblies and processes using other methods of moving and fixing the backing plate also fall within the scope of this invention.

Figure 10:
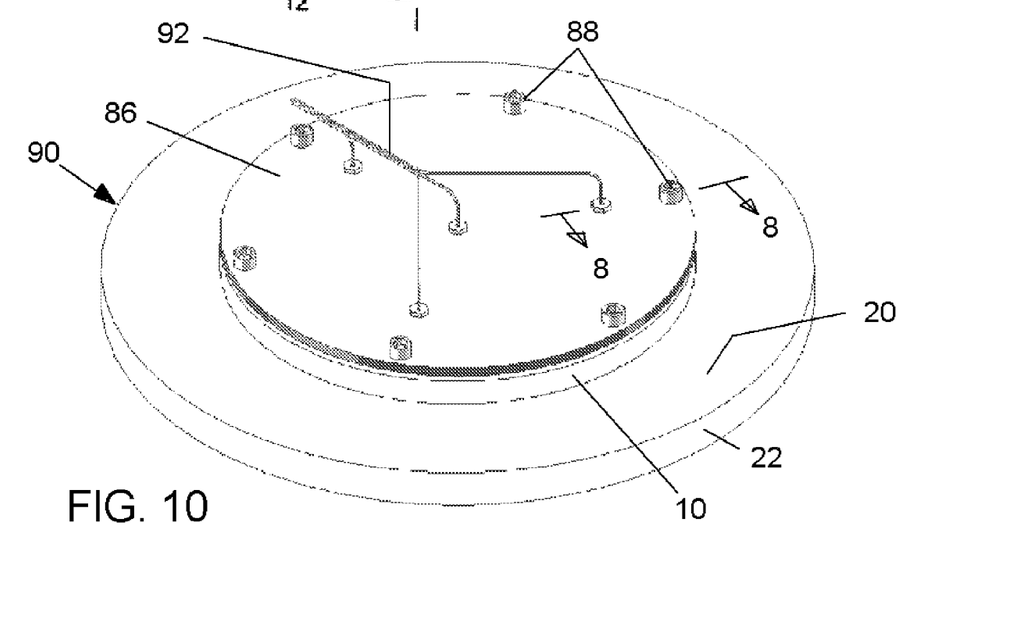
FIG. 10 show a backing plate bolted to the top of a mounting ring on a ship surface, and flow tubes entering the backing plate at four points to contact four transducers (not visible) directly mounted on the ship surface below.

The backing plate 86 may be removed or may be left in place once the transducer(s) 51 have been affixed to the surface 20. The backing plate 86 (or "alignment plate") may be adapted to align and position one or more transducers 51 in defined orientations within a mounting ring 10, for example, precisely aligned with transducers on the opposite side of a ship's hull. FIG. 10 shows a preferred embodiment where a backing plate 86 has been adapted to hold and align four transducers (transducers not visible in FIG. 10) on a ship's hull 20, and also to accommodate electronics and wiring leading to each of the four transducers passing through the backing plate 86.

A preferred method of attaching a transducer 51 directly to a submerged hull surface 20 is as follows:

A transducer 51 is positioned within an elastic backing 80 and a flange 82. This assembly is gently pressed against a submerged surface 20 such that the flange 82 of the backing 80 (which creates the "suction cup"-like appendage) comes into contact with the surface 20 and deforms slightly to create a light water-tight seal with the hull. At this point, there should still be a separation between the transducer 51 and the hull surface 20 forming a cavity 83.

Compressed air is then forced through a central hole 84 via tubing 92, pressurizing the cavity 83 within the suction cup, causing the water contained in the cavity to be pushed out through the seal created by the flange 82 and hull surface 20. Once this step is completed, epoxy is forced into the cavity 83 between the transducer 51 and hull surface 20 via the same central hole 84. Preferably, sufficient epoxy is added to fill the cavity 83 and to force the air out of the cavity. FIG. 7 illustrates how this step appears in one possible embodiment.

A larger normal force is then applied to the backing 80 in the direction of the hull surface 20 to cause the flange 82 to distort further and push the transducer 51 into contact with the wall 20. In one embodiment this force is supplied by a backing plate 86 moving towards the surface 20 by the action of bolts 88 being threaded downwards into bolt holes 11. This force will greatly shrink, and potentially eliminate, the cavity 83, and will push excess epoxy out through the seal created by the flange 82. FIG. 8 shows a side view of how this step may appear. This force should be sustained until the epoxy has completely cured.

Once the epoxy has cured, the elastic backing 80, the flange 82, and any backing plate 86 may optionally be removed. If the elastic backing 80 is to be removed, electronics may be affixed to the affixed transducer(s) 51 at this point.

The Mounting Ring

One advantage of the present invention is that it adapts a single hardware concept, the mounting ring 10, for several transducer mounting methods, and also provides a method of aligning mounting rings across a barrier where both sides of the barrier cannot be viewed simultaneously.

It will be appreciated that the basic ring concept can be varied somewhat without departing from the invention. Different materials, different size rings, and even "rings" having non-circular shapes can be adapted for use with the methods and assemblies described herein. The term "mounting member" is broader term referring generally to hull attachments that have the same general form and function as a "mounting ring" but which may or may not take the form of a circular section of a cylinder. The preferred embodiments employ a circular ring structure resembling a section of a hollow cylinder purely for design simplicity, and this invention is not limited to round configurations.

The mounting ring may be attached to the communication surface by the most convenient means available. In the case of boat and submarine hulls, this will often be via welding or marine glue. The mounting ring is preferably thick enough to support six or more ⅜ inch-16 threads/inch bolt holes for connection of additional hardware, and strong enough to serve as a foundation which all other mounting hardware can connect to. The preferred outer diameter was chosen to be 12 in., with the ring thickness and height both measuring 0.75 in.

Rotational Alignment Across a Hull Wall

For the transducer communication systems to operate effectively, it is necessary to ensure that the mounting rings are coaxially and rotationally aligned on either side of the hull. To achieve this, ultrasonic peaking may be done using transducers, such as ultrasonic NDT transducers or piezoelectric transducers. In "peaking" a first transducer fixed at a point on one side of a wall transmits a pulse train, while a second transducer on the opposite side is moved to various locations to find the location corresponding to the maximum received amplitude. The location of maximum amplitude corresponds to the position of the first transducer on the opposite side of the wall.

Any device which emits signals that can be accurately located on the opposite side of the barrier may be used in place of the preferred ultrasonic transducers for alignment.

A single peaked axially-aligned transducer would suffice for simple coaxial alignment of the mounting rings, but it is preferable to have alignment of the screw or bolt holes 11 on the mounting rings as well to aid in individual transducer angular alignments. Thus, it is highly desirable to achieve rotational alignment, which requires aligning a minimum of two transducers and/or peaks.

FIGS. 2A and 2B show a preferred assembly employing two transducers to rotationally align mounting rings 10 across the thickness of a wall. The assembly consists of an alignment plate or "alignment arrangement" 40 which is attached to the mounting ring 10 via two screws 42, preferably on the submerged outside surface 20 of a hull. At a symmetric separation from the central axis, two transducers 44 with strongly-damped backings are attached by screws 46 to the alignment plate. The transducers may be attached to backings that receive the screws 46. The alignment plate and transducer backings are adapted such that the transducers 44 may be effectively forced against the hull or other surface 20.

The term "alignment arrangement" 40 refers to an arrangement comprising a plurality of transducers and for temporary attachment to a mounting ring 10 as described above for alignment across a hull wall. An "alignment arrangement" may take a variety of shapes and includes, but is not limited to, the "alignment plate" of the preferred embodiment as shown in FIG. 2A and described elsewhere.

The contact between the alignment transducers 44 and the hull is temporary and does not necessarily need to be optimized. As such, either no coupling agent is required, effectively using the surrounding water as the couplant (if used on the exterior of the hull, which is preferable), or a water non-soluble acoustic couplant may be applied to the interface.

A single movable transducer may be used to determine the positions of the two transducers 44 from the opposite, preferably internal side of the hull wall 24 using signal peaking. Once the location of both transducers are marked on the opposite side 24 of the wall, and knowing the locations of the transducers 44 connected to the already-attached mounting ring 10, the second mount ring may be rotationally aligned by lining up the marked transducer locations on the inner hull wall 24 with their appropriate reference points to the second mounting ring.

Alternatively, a second mounting ring engaged to a second alignment plate in a mirror-image configuration, having the same number of and a mirror-image arrangement of transducers as the first alignment plate may be aligned on the opposite side of the wall by simultaneously peaking a plurality of transducers.

If the transducers and mounting ring are arranged such that they show rotational symmetry, then using the two markings may align all transducers with some identity ambiguity. For example: if there were 2 communication crystals 44 (crystal A and crystal B) set at the same radial distance from the center of the first mount ring 10, and separated by 180 degrees, this alignment procedure would not distinguish between the alignment of crystals A or B vis a vis the opposite side of the wall 24. This can easily be compensated for, however, by a manual post-alignment connection of each transducer to its corresponding electronics on the inside of the ship.

Alternatively, a third transducer providing a third peaking point may be used to prevent any mirror-image ambiguity.

Mounting Transducers Via Intermediary Layer

Transducers may be mounted to a submerged surface employing an intermediary layer between the transducers and the wall interface, preferably in conjunction with a mounting ring 10. This intermediary layer is preferably a large metallic plate, most preferably constructed of the same material as the hull. The plate can be attached to a hull via a water-resistant adhesive bond, preferably epoxy.

The intermediary plate has one or more transducers pre-attached to it in a laboratory or factory environment, and is preferably sized to fit within the mounting ring 10 it is to be used with. Those of skill in the art will recognize that a variety of transducer-related electronics may be advantageously affixed to such plates for later underwater mounting. Using this method, once two mounting rings have been rotationally aligned across a hull wall, multiple transducers pre-mounted on plates can easily be aligned across the same hull wall by installing the plates within the aligned rings using the rotationally aligned bolt holes 11.

For the intermediary plate configuration, two general methods for removing water from the plate-hull interface, and then applying epoxy to the interface, are proposed. For both methods, it is assumed that the plate (which may be identical in each case) and/or the mounting ring have inlet 53 and outlet 55 ports for fluids and gases to flow into and out of the gap between the plate and hull. A variety of outlet arrangements may be used, but it is preferable to use at least two outlets, and that the outlets be spaced apart. Furthermore, the plate and the mounting ring should be sealed in some fashion to prevent the back-flow of seawater into the gap or cavity 73.

The first preferred method for prepping the hull 22 surface 20 and mounting plate 50 surfaces and applying the epoxy calls for the mounting plate to be held at a fixed distance from the hull, while the cavity 73 is flushed with an easily evaporable liquid (e.g. alcohol or acetone) which will in effect clean both the hull and plate surface while also removing water from the gap. Once this flushing is completed, the gap will be filled completely with said liquid.

To remove the evaporable liquid, compressed air (or some other gas) is forced into the gap, pushing as much of the evaporable flushing fluid out as possible. The evaporable liquid can be removed from the cavity much more completely and efficiently using forced air and vacuums than water, especially sea water, could be. The evaporable liquid will also be substantially free from contaminants, unlike ocean, lake or river water.

Upon the extraction of as much evaporable fluid as possible, a vacuum is immediately applied to the cavity 73 or gap via one or more ports or holes 53, 55. This vacuum accomplishes two things. First, it expedites the evaporation of any remaining flushing liquid. Second, it reduces the amount of gas within the gap, which in turn reduces the chance of bubbles being caught within the epoxy layer between the plate and the hull wall. While the vacuum is still being applied, epoxy is injected, preferably via the inlet port 53, until it permeates the gap 73 and begins to flow out of the outlet port 55 at which the vacuum is being applied. Once this occurs, the vacuum is then removed and the epoxy flow is stopped. The mounting plate 50 is pressed towards and against the hull surface 20, allowing excess epoxy to flow from the ports. The force used to press the plate against the hull should continue to be applied until the epoxy has cured to ensure that the bonding layer is as thin as possible and to keep water out.

The force may be applied against the mounting plate 50 using essentially any means. Preferably, a pressing plate 60 coupled to a hydraulic mechanism is used. Attachments to bolt holes 11 in the mounting ring 10 could also be adapted to hold down the mounting plate 50.

A second preferred embodiment for evacuating the gap 73 and applying the epoxy was developed to remove the need for a vacuum to be applied. The mounting plate 50 and the mounting ring 10 are used in a manner resembling the action of a fluid piston pump, where the plate 50 acts as a piston. A sealant 72, such as an O-ring or a viscous, water-resistant lubricant, is preferably employed to prevent water from penetrating the junction between the mounting plate and the mounting ring, while still allowing the plate to move towards and away from the hull surface within the mounting ring. A simplified order of events for this method is presented in FIG. 3. Those of skill in the art will appreciate that some variation in these steps is possible to achieve the same or similar result.

The major steps of this second preferred method are shown in FIGS. 3A to 3D. The method begins with the plate 50 being inserted into the mounting ring 10, resulting in a gap or cavity 73 between the hull surface 20 and mounting plate, the cavity containing seawater. FIG. 3A step (1). During the next step (FIG. 3B step (2)) the plate is pushed towards and against the hull, forcing the water within the gap to flow out of the gap 73 through the outlet port 55 and/or any other available openings. Once the mounting plate 50 is pushed all the way against the hull surface (FIG. 3C (3)), a small amount of water may remain in the interface, but should preferably still be removed to ensure proper coupling.

To accomplish this, an evaporable fluid, such as alcohol or acetone, should be added to the gap 73. This can be achieved by injecting the fluid into the inlet port 53 while the mounting plate 50 is pulled away from the wall (FIG. 3D step (4)). It may be necessary to block certain openings to keep seawater from reentering the cavity. This step brings the system back to FIG. 3A step (1), except that the gap is now filled with evaporable flushing fluid instead of seawater. The same 4 steps are then repeated using forced air (or some other gas) to evaporate the remaining evaporable liquid, and again repeated with epoxy. It may be necessary to keep the forced air turned on during steps (2) and (3) of the forced air cycle to keep water out of the cavity. Once the cavity 73 is filled with epoxy in a manner resembling FIG. 3C step (3), the excess epoxy having been forced out in the previous step, the mounting plate 50 should be held in place while the epoxy cures.

This second preferred method accomplishes the same end result as the first method, except instead of controlling the amount of material in the gap via forced liquids, forced fluids, and a vacuum (applied to a cavity 73 at mostly constant volume), liquids and gasses are added or removed by increasing and decreasing the volume of the gap or cavity 73 (at constant pressure) and by forcing substances into the cavity.

Various combinations of these methods can be readily employed to achieve removal of water from the cavity 73, filling the cavity with bubble-free adhesive, and forcing and holding the plate 50 into contact with the surface 20 while a permanent bond forms. Methods that combine the use of a vacuum and repeatedly altering the volume of the gap are also within this scope of this invention, and will be obvious to individuals of skill in the relevant arts.

Intermediary Mounting Plate

FIGS. 4A and 4B show a preferred mounting plate 50 that can be used with, for example, either of the plate mounting methods described above. The top side 70 carries one or more transducers and the bottom side 71 of the mounting plate is preferably attached to a hull surface. Preferably, two plates similar to the example shown in FIGS. 4A and 4B are aligned and attached on opposite sides of a wall to communicate power and signals through the wall.

The preferred transducer mounting plate 50 shown in FIGS. 4A and 4B allows for the mounting of three data communication transducers 54 and one large power transducer 52. In this preferred representation, there is more detail shown than is required for a mounting plate usable for this invention.

Each of the transducers 52, 54, preferably sits in a depression in the top 70 of the plate 50. This feature is meant to improve the system's transducer-transducer isolation by eliminating the path for surface acoustic waves (SAWs) to travel between transducers.

The two smaller holes seen in FIGS. 3A to 4B represent the input 53 and output 55 ports for fluid and gasses to flow into and out of the cavity 73 under the mounting plate 50 during the installation process. More or fewer ports may be used, but two ports spaced apart are preferred.

On the bottom side 71 of the plate, an optional snaking groove or "continuous channel" 56 is shown. Such grooves may be useful for methods where epoxy is injected between a mounting plate 50 and the hull surface 20 when they are already pressed together leaving little space between them. Preferably, the channel 56 is a single continuous, snaking path that leads from the input hole 53 to the outlet hole 55 and is adapted to guide epoxy between those holes, although other configurations may be used to distribute epoxy. The channel is preferably adapted to make sure that epoxy reaches the entire interface between the mounting plate 50 and the surface 20, particularly locations near the transducers 52, 54.

FIGS. 4A and 4B do not specifically show any means for creating a seal at the wall interface between the mounting plate 50 and mounting ring 10. It is preferable, however, to employ some sealant that allows the plate to move past the ring 10 like a piston while preventing water from passion through the interface. This seal could be accomplished with the use of an O-ring, certain viscous lubricants, or other traditional methods.

Preferred Hardware for Maneuvering Mounting Plate

Three holes 58 are also shown on the top 70 of the plate in FIG. 4A. These holes are most preferably threaded to allow for the connection of bolts to the mounting plate 50, and may be used to temporarily attach a pressing plate 60 to the mounting plate 50 (see FIG. 5) by bolts 62. The hardware for pushing and pulling the mounting plate 50 during the underwater adhesion process may be, in a preferred embodiment, a smaller pressing plate 60 with a central hole and preferably three non-threaded bolt holes to match those 58 on the plate 50. The bolt holes on this pressing plate 60, however, are clearance holes. A bolt 62 is passed through this hole and screwed into the transducer plate 50, preferably with 1 inch die springs 64 positioned between the plates 50, 60, as illustrated in FIGS. 5. and 11. The central hole in the pressing plate 60 is meant for the connection of some means to push and pull the plate. This may be accomplished with, for example, a simple hydraulic system.

Pressure on the pressing plate 60 towards the surface 20 is transferred to the transducer mounting plate 50, which is then moved such that it comes into contact with the hull surface 20. At this point, the springs 64 may begin to compress and bend, allowing the mounting plate to pivot about its first surface 20 contact point. This preferably causes the mounting plate to come to an alignment where the transducer mounting plate 50 is at an optimum, minimum angle to the hull surface 20 (which will often have some curvature to it). FIGS. 11A and 11B show enlarged sectional views of a pressing plate 60 pushing a mounting plate 50 against a hull surface 20 before (left) and after (right) spring compression. Here, it is shown that as the mounting plate 50 is pushed up against the hull, the bolt 62 is allowed to move away from the pressing plate 60, while force is applied through the compression of the spring 64. To pull the mounting plate back, the pressing plate is moved backwards into contact with the heads of the bolts 62, at which point a backwards force would also be applied to retract the transducer plate.

At the point when epoxy is applied to the plate-hull interface, the springs 64 pressed against the mounting plate 50 should be held in compression until the epoxy has cured, at which point the applied force, the three bolts 62, the springs 64, and the pressing plate 60 can all be removed, leaving only the transducer plate 50 attached to the hull surface 20. At this point additional electronics for use with the transducers may be attached to the mount plate.

The method of moving mounting plates within the mounting ring using a pressing plate, holes in the top side of the mounting plate, and springs described above is merely a preferred embodiment.

Mounting Transducers Via Direct Attachment to Hull

While the underwater coupling methods presented above are advantageous in that multiple transducers may be mounted to a plate prior to submersion, and in that only one interface needs to be coupled (plate-to-hull), there are also advantages to attaching the transducers directly. The additional complexity associated with direct transducer mounting methods may be justified, however, because direct attachment of the transducers to the hull allows better communication and more efficient power transfer. As a result, additional methods for coupling transducers to the hull directly and individually have been developed.

The instant design for direct attachment involves temporarily mounting the transducers to a highly elastic backing (i.e., rubber, silicone, resilient plastics etc.). This backing, an example of which is shown in FIGS. 6A and 6B, is preferably similar to a suction cup, with the transducer held in the center of its cavity, although other shapes allowing for similar water-resistant seals may also be used. Both the backing and the transducers for this design have a hole, preferably through their axes. This hole is used as a port for injection of air, epoxy, and potentially other substances. Introducing a small hole through the center of the transducers has a negligible effect on its overall piezoelectric response.

Using this method, transducers may be applied to the hull individually, but the issue of arranging and aligning the transducers is still a concern as manual placement of the piezos (or other transducers) may result in inaccurately aligned channels. To allow the direct transducer attachment method to have a predefined arrangement of transducer crystals on the hull, it is possible connect the transducer-backing assemblies to an alignment plate or backing plate 86 which will allow for strict position definition. Further, if an alignment plate is involved, the mechanisms to apply the compressed air and epoxy (e.g., tubing 92) may be integrated to allow for a simplified mounting procedure.

FIG. 10 shows a preferred direct-attachment transducer assembly that may be implemented using this methods and apparatus of this invention. A backing plate 86 has been adapted to hold and align four transducers (transducers not visible in FIG. 10) on a ship's hull 20. Tubes 92 are shown entering the backing plate 86 at four points, each leading to a transducer mounted to the hull surface 20 below. The backing plate is attached to the mounting ring 10 via six screws. This sort of assembly, including the backing plate 86, may be left in place permanently. Variations on this preferred backing plate accommodating, for example, different transducer numbers and arrangements, different electronics, different mounting ring shapes, and different surfaces, also fall within the scope of this invention.

Alternatively, backing or alignment plates 86 can be employed only during the steps of aligning and/or pressing the backings 80 and transducers 51 on the surface 20, and eventually be removed from the assembly 90.

In the preferred configuration of FIG. 10, the synchronous attachment of three communication and one power transducer may be accomplished. To distribute compressed air and epoxy (for example, pursuant to the direct mounting method described above) to each of the four transducer mount locations, tubing 92 is routed from a manifold (not depicted, preferably located in upper-left of FIG. 10) to each mount location via holes through the backing alignment plate 86. The tubing 92 may be held in place, for example, by compression nuts on the alignment plate.

The elastic backings 80 (shown connected to the alignment plate in FIG. 7) are preferably attached rigidly to the backing plate 86 via screws through the backing.

To provide the compressive force to the assemblies required for attachment, a gap is preferably left between the backing plate 86 and the mounting ring 10 during initial assembly, as shown in FIG. 7, so that the backing 80 is not fully pressed towards the surface 20. The cavity 83 between the backing 80 and the surface 20 is preferably held constant during the compressed air flushing and the subsequent application of epoxy. Once the epoxy is applied, the screws or bolts 88 which connect the backing plate 86 and mounting ring 10 may be tightened, causing one or more elastic backings 80 to push their respective transducers 51 against the wall 80. This will also push any excess epoxy out of the gap or cavity 83 and shrink or eliminate the cavity. The coupling force may be sustained throughout epoxy curing in this embodiment merely by leaving the backing plate 86 screwed in place (see FIG. 8).

In an alternative preferred embodiment, tubing 92 for delivering compressed air and epoxy is adapted to fit within the backings 80, such as through a central hole 84. Using removable tubing to deliver epoxy reduces the risk that unwanted epoxy bonds will form between the transducer, the backing, and/or the backing plate. The hole 84 is preferably designed both to create a seal around the tubing (if the tubing is used and inserted correctly) and a pathway to the gap between the transducers 51 and surface 20. Preferably the tubing can be removed from the hole 84 after all necessary epoxy has been delivered. Most preferably the tubing is removed, via loosening of the compression nuts, once the bolts 88 holding the backing plate 86 and the backings 80 down have been tightened, but before the epoxy has cured.

Once the tubing 92 is removed, the hole 84 may be repurposed, such as for inserting electronic elements to contact the transducer 51.

Alternatively, the flexible backing 80 and the alignment or backing plate 86 may be removed and reused for future installations after the epoxy hardens. If the elastic backings are rigidly connected to the backing plate, removal of the backing plate may be affected by the material composition of the elastic backings, specifically, the ability of the backing to resist adhesion to any stray epoxy it may come into contact with. It is preferable that the backing 80 and flange 82 be comprised of or coated with materials that will not be bound by epoxy.

If the backing plate and elastic backings are removed, only the transducers will be left on the submerged hull. At this point, the electronics required to operate the system may be attached. This will require a seawater submersible electrical connector or another method of electrical connection. The mounting design may be adjusted to allow the electronics package to be mounted simultaneously with the transducers, which is within the capacity of persons of skill in the art.

While several specific embodiments and aspects of the invention have been shown and described in detail to illustrate the application of the principles of the invention, it will be understood that the invention may be embodied otherwise without departing from such principles.

What is claimed is:

1. An assembly for mounting a transducer directly to a submerged exterior surface of a submerged wall without perforating the wall, the assembly comprising:

a transducer comprising a transmitting face for emitting acoustical transmissions, the transducer also comprising a back side generally opposite the transmitting face;

the back side of the transducer mounted to a backing, the backing having a resilient flange at its periphery;

the backing and the flange being positioned at the exterior surface of the submerged wall so that the backing, the flange, and the exterior surface of the submerged wall collectively form a cavity with the transducer held in the cavity, with at least the flange contacting the exterior surface, and with the transmitting face of the transducer facing the exterior surface and the back side of the transducer facing generally away from the exterior surface and towards the backing;

the assembly being adapted so that when the backing is pressed towards the surface, the resilient flange contacts the surface and creates a temporary seal, surrounding the transducer, with the exterior surface;

the assembly being adapted so that when the backing is pressed towards the surface, the transmitting face of the transducer also contacts the exterior surface, and the resilient flange is capable of flexing to accommodate movement by the backing and transducer;

the transducer and the backing together comprising a continuous hole which does not pass through the submerged wall, the continuous hole being adapted to pass liquids and gasses to the space in the cavity between the transmitting face of the transducer and the exterior surface of the submerged wall.

2. The assembly as claimed in claim 1, the assembly further comprising a backing plate removably engaged with the backing; the backing plate being adapted to press one or more backings towards the exterior surface of the submerged wall.

3. The assembly as claimed in claim 1, the assembly further comprising a round mounting ring, in the form on a section of a hollow cylinder, fixed to the exterior surface of the submerged wall; the backing, the flange, and the transducer being positioned on a portion of the exterior surface of the submerged wall within the circumference of the mounting ring; the assembly further comprising a backing plate removably connected to the mounting ring; the backing plate being adapted to selectably press one or more backings towards the exterior surface of the submerged wall.

4. The assembly as claimed in claim 1, the assembly further comprising a tube passing through the continuous hole through the backing and the transducer which does not pass through the submerged wall, wherein the tube is adapted for passing liquids and gasses to the interface between the transmitting face of the transducer and the exterior surface.

5. The assembly as claimed in claim 1, wherein the backing and the flange comprise an elastic material.

6. The assembly as claimed in claim 1, wherein the backing and the flange collectively form a suction cup shape and the transducer is mounted to the backing inside of the suction cup and is surrounded by the flange.

7. The assembly of claim 1, wherein the submerged wall is a hull of a water craft which is in water, and wherein the assembly is positioned against a submerged exterior surface of the hull which is under water.

8. The assembly of claim 7, wherein the assembly is positioned against a portion of the submerged exterior surface of the hull which does not have any openings there through.

9. The assembly of claim 1, wherein the assembly is positioned against an exterior surface of a submerged wall, and wherein at least an area of the submerged wall where the arrangement is positioned does not have any openings there through.

10. A method for attaching a transducer directly to an exterior surface of a submerged wall without perforating the wall, the method comprising the following steps:
providing a transducer comprising a transmitting face for emitting acoustical transmissions, the transducer also comprising a back side;
attaching the back side of the transducer to a backing, the backing comprising a flange;
placing the backing near the exterior surface of the submerged wall so that at least the flange contacts the exterior surface, wherein the backing, the flange, and the exterior surface collectively form a cavity, wherein the transducer is positioned in that cavity with the transmitting face facing the exterior surface and the back side facing generally away from the submerged wall and towards the backing, and wherein the backing and the transducer together comprise a hole communicating between the outside of the backing and the cavity, said hole not passing through the submerged wall;
forcing a gas through the hole to pressurize the area within the cavity to force any water out of the cavity;
injecting adhesive through the hole into the cavity until the cavity is substantially filled with the adhesive;
applying force to the backing in the direction of the submerged wall until the transducer comes into contact with the exterior surface, simultaneously shrinking the cavity and forcing any excess adhesive out of the cavity;
maintaining pressure on the backing to hold the transducer against the surface until the adhesive has bonded the transmitting face of the transducer to the exterior surface of the submerged wall.

11. The method of claim 10, further comprising the step of removing the backing from the transducer after the adhesive has bonded the transducer to the exterior surface of the submerged wall.

12. The method of claim 10 wherein the backing, the flange, and the transducer are positioned on a portion of the exterior surface that is within the circumference of a round mounting ring fixed to the exterior surface, wherein the mounting ring is in the form of a section of a hollow cylinder, and wherein the mounting ring comprises a plurality of threaded holes spaced about its circumference; and
wherein the steps of applying and maintaining pressure on the backing in the direction of the surface are accomplished by fixing a backing plate to the mounting ring by engaging one or more threaded couplings with one or more threaded holes on the mounting ring, wherein the backing plate is superior to the backing with relation to the exterior surface of the submerged wall, by twisting the one or more threaded couplings into their respective threaded holes in the mounting ring until the transducer is moved into contact with the exterior surface, such twisting being adapted to move the backing plate towards the exterior surface, the backing plate thereby pushing the backing and the transmitting face of the transducer towards the exterior surface; and by leaving the backing plate in place until the adhesive fixing the transducer to the exterior surface hardens.

13. The method of claim 10, wherein the submerged wall is a hull of a water craft which is in water, wherein the assembly is positioned against a submerged exterior surface of the hull which is under water, and wherein the transducer is bonded to a portion of the hull which does not have any openings through the hull.

14. The method of claim 10, wherein the gas and the adhesive are delivered to the cavity through a tube which passes through the continuous hole through the backing and the transducer, wherein the tube does not pass through the submerged wall.

15. An assembly for mounting a transducer directly to a submerged exterior surface of a submerged wall without perforating the wall, the assembly comprising:
a transducer comprising a transmitting face for emitting acoustical transmissions, the transducer also comprising a back side generally opposite the transmitting face;
the back side of the transducer mounted to a backing, the backing having a resilient flange at its periphery;
the backing and the flange being positioned at the exterior surface of the submerged wall so that the backing, flange, and the exterior surface of the submerged wall collectively form a cavity with the transducer held in the cavity, with the flange contacting the exterior surface, and with the transmitting face of the transducer held against the exterior surface and radially surrounded by the flange;

the backing is pressed towards the exterior surface, and the resilient flange is against the exterior surface forming a resilient seal, surrounding the transducer, with the exterior surface;

the transducer and the backing together comprising a continuous hole which does not pass through the submerged wall, the continuous hole being adapted to pass adhesives and gasses to the space in the cavity between the transmitting face of the transducer and the exterior surface of the submerged wall;

wherein adhesive is present in the cavity including between the transmitting face of the transducer and the exterior surface of the submerged wall, and wherein the cavity between the transducer and the exterior surface is substantially free of water and gasses.

* * * * *